United States Patent
Goossen et al.

(10) Patent No.: US 8,205,820 B2
(45) Date of Patent: Jun. 26, 2012

(54) TRANSFORMING UNMANNED AERIAL-TO-GROUND VEHICLE

(75) Inventors: Emray R. Goossen, Albuquerque, NM (US); Randall E. Horn, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 803 days.

(21) Appl. No.: 12/364,762

(22) Filed: Feb. 3, 2009

(65) Prior Publication Data

US 2010/0193626 A1  Aug. 5, 2010

(51) Int. Cl.
*B64C 37/00* (2006.01)
(52) U.S. Cl. ............ 244/2; 244/63; 244/110 E
(58) Field of Classification Search ........... 244/2, 3, 244/4 A, 7 B, 12.3, 63, 110 E
See application file for complete search history.

(56) References Cited

U.S. PATENT DOCUMENTS

| | | | |
|---|---|---|---|
| 4,171,784 A * | 10/1979 | Eickmann | 244/2 |
| 4,173,321 A * | 11/1979 | Eickmann | 244/2 |
| 4,678,141 A * | 7/1987 | Sarrantonio | 244/2 |
| 5,150,857 A | 9/1992 | Moffitt et al. | |
| 5,152,478 A | 10/1992 | Cycon et al. | |
| 5,295,643 A | 3/1994 | Ebbert et al. | |
| 5,383,810 A | 1/1995 | Loving | |
| 5,575,438 A | 11/1996 | McGonigle et al. | |
| 5,695,153 A | 12/1997 | Britton et al. | |
| 5,988,038 A | 11/1999 | Feintuch | |
| 6,056,237 A | 5/2000 | Woodland | |
| 6,450,445 B1 | 9/2002 | Moller | |
| 6,588,701 B2 * | 7/2003 | Yavnai | 244/23 B |
| 6,604,706 B1 | 8/2003 | Bostan | |
| 6,691,949 B2 | 2/2004 | Plump et al. | |
| 6,721,646 B2 | 4/2004 | Carroll | |
| 6,854,686 B2 | 2/2005 | Perlo et al. | |
| 6,955,324 B2 * | 10/2005 | Tanielian | 244/3.13 |
| 7,032,861 B2 | 4/2006 | Sanders, Jr. et al. | |
| 7,044,422 B2 | 5/2006 | Bostan | |
| 7,149,611 B2 * | 12/2006 | Beck et al. | 244/3.15 |
| 7,249,732 B2 | 7/2007 | Sanders, Jr. et al. | |
| 7,959,104 B2 * | 6/2011 | Kuntz | 244/2 |

(Continued)

FOREIGN PATENT DOCUMENTS

EP      1767453 A1     3/2007

(Continued)

OTHER PUBLICATIONS

Unmanned Tactical Air-Ground Systems Family of Unmanned Systems Experiment, Abstract, Robot and Human Interactive Communication, 2005, IEEE International Workshop. Pub. Date Aug. 13-15, pp. 103-108.

*Primary Examiner* — Timothy D Collins
*Assistant Examiner* — Steven Hawk
(74) *Attorney, Agent, or Firm* — Shumaker & Sieffert, P.A.

(57) ABSTRACT

A transforming unmanned aerial-to-ground vehicle assembly comprising: an aerodynamic flying assembly comprising an unmanned aerial vehicle integrated with an unmanned ground vehicle, a power unit shared by the unmanned aerial vehicle and the unmanned ground vehicle, vehicle controls shared by the unmanned aerial vehicle and the unmanned ground vehicle, a disengagement mechanism to separate the unmanned ground vehicle from the unmanned aerial vehicle, one or more manipulator arms located on either the unmanned aerial vehicle or the unmanned ground vehicle, and landing gear.

20 Claims, 6 Drawing Sheets

U.S. PATENT DOCUMENTS

| | | | |
|---|---|---|---|
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2006/0049304 A1 | 3/2006 | Sanders, Jr. et al. | |
| 2006/0192047 A1* | 8/2006 | Goossen | 244/17.23 |
| 2006/0231675 A1 | 10/2006 | Bostan | |
| 2007/0012817 A1* | 1/2007 | Parmley | 244/2 |
| 2007/0034738 A1 | 2/2007 | Sanders, Jr. et al. | |
| 2007/0035304 A1 | 2/2007 | Stolarczyk et al. | |
| 2007/0051848 A1 | 3/2007 | Mantych et al. | |
| 2007/0107917 A1 | 5/2007 | Doherty et al. | |
| 2007/0193650 A1 | 8/2007 | Annati | |
| 2007/0205937 A1 | 9/2007 | Thompson et al. | |
| 2007/0221790 A1 | 9/2007 | Goossen et al. | |
| 2007/0228214 A1* | 10/2007 | Horak | 244/63 |
| 2007/0244608 A1 | 10/2007 | Rath et al. | |
| 2007/0262195 A1 | 11/2007 | Bulaga et al. | |
| 2007/0295298 A1 | 12/2007 | Mark | |
| 2009/0314883 A1* | 12/2009 | Arlton et al. | 244/63 |

FOREIGN PATENT DOCUMENTS

| | | |
|---|---|---|
| EP | 1767453 B1 | 6/2008 |
| WO | 0015497 | 3/2000 |
| WO | 2004002821 | 1/2004 |
| WO | 2006093641 | 9/2006 |

\* cited by examiner

TRANSFORMING UNMANNED AERIAL-TO-GROUND VEHICLE

BACKGROUND OF THE INVENTION

An unmanned aerial vehicle (UAV) is an unpiloted aircraft. UAVs can be remote controlled or fly autonomously based on pre-programmed flight plans or more complex dynamic automation systems. UAVs are currently used in a number of military roles, including reconnaissance and attack. They are also used in a small but growing number of civil applications such as firefighting when a human observer would be at risk, police observation of civil disturbances and crime scenes, and reconnaissance support in natural disasters. UAVs are often preferred for missions that are too dull, dirty, or dangerous for manned aircraft. There is a wide variety of UAV shapes, sizes, configurations, and characteristics, but generally, a UAV is capable of controlled, sustained, level flight and is powered by a jet, reciprocating or turbine engine.

UAVs may have remote sensing functions that include electromagnetic spectrum sensors, biological sensors, and chemical sensors. UAVs can transport goods using various means based on the configuration of the UAV itself. Most payloads are stored in an internal pod somewhere in the airframe or duct. UAVs may further be used for search and rescue in inclement weather or reconnaissance missions in enemy territory.

Similarly, unmanned ground vehicles (UGV) are robotic platforms that are used as an extension of human capability. This type of robot is generally capable of operating outdoors and over a wide variety of terrain, functioning in place of humans. There are two general classes of UGVs: autonomous and teleoperated. Autonomous UGVs are essentially an autonomous robot, whereas teleoperated UGVs are vehicles that are controlled by a human operator at a remote location via a communications link. All cognitive processes are provided by the operator based upon sensory feedback from either line-of-sight visual observation or remote sensory input such as video cameras. The operator controls the vehicle via a wired or wireless connection while the user provides all control based upon observed performance of the vehicle. There are a wide variety of teleoperated UGVs in use today. Examples are explosives and bomb disabling vehicles.

UGVs have the ability to gain information about the surrounding environment and detect objects of interest such as people and vehicles. UGVs can also work for extended durations without human intervention or travel from point A to point B without human navigation assistance, while avoiding situations that are harmful to people or itself. If a UGV is harmed, it may have the ability to repair itself without outside assistance.

A disadvantage associated with current UGVs is slow deployment to a threat due to their ground ambulation mechanism, for example, wheels or continuous tracks, as well as an inability to maneuver through irregularities in terrain, such as fast moving rivers or steep trenches. A disadvantage associated with UAVs is that they are more likely to be detected en route to a mission in the open air.

SUMMARY OF THE INVENTION

Outlined herein is a transforming unmanned aerial-to-ground vehicle. The present invention has the beneficial effects of rapid deployment of an unmanned ground vehicle and/or obstacle avoidance through integration with an unmanned aerial vehicle.

In one aspect, the present invention provides a transforming unmanned aerial-to-ground vehicle assembly comprising: (a) an unmanned aerial vehicle integrated with an unmanned ground vehicle, (b) a power unit shared by the unmanned aerial vehicle and the unmanned ground vehicle, (c) vehicle controls shared by the unmanned aerial vehicle and the unmanned ground vehicle, (d) a disengagement mechanism to separate the unmanned ground vehicle from the unmanned aerial vehicle, (e) one or more manipulator arms located on either the unmanned aerial vehicle or the unmanned ground vehicle, and (f) landing gear.

DETAILED DESCRIPTION OF THE PREFERRED EMBODIMENT

Figure 1:
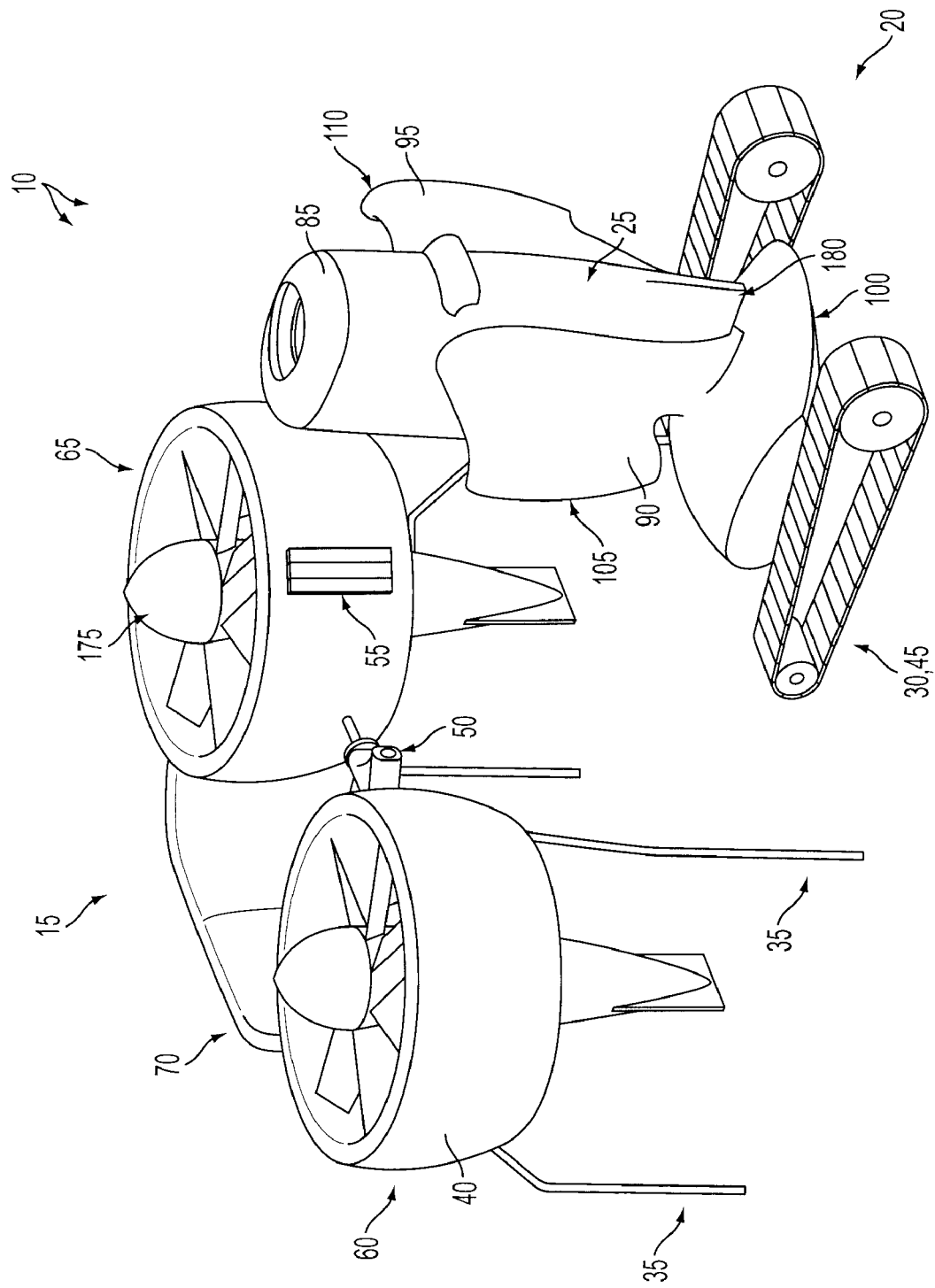
FIG. 1 is a perspective view of a transforming unmanned aerial-to-ground vehicle assembly in which the unmanned ground vehicle is disengaged from the unmanned aerial vehicle and in which the unmanned ground vehicle is in the active position.

In one aspect, as shown in FIGS. 1-4 and 6, the present invention provides a transforming unmanned aerial-to-ground vehicle assembly 10 comprising: (a) an unmanned aerial vehicle 15 integrated with an unmanned ground vehicle 20, (b) a power unit 25 shared by the unmanned aerial vehicle 15 and the unmanned ground vehicle 20, (c) vehicle controls shared by the unmanned aerial vehicle 15 and the unmanned ground vehicle 20, (d) a disengagement mechanism 30 to separate the unmanned ground vehicle 20 from the unmanned aerial vehicle 15, (e) one or more manipulator arms 140 located on either the unmanned aerial vehicle 15 or the unmanned ground vehicle 20, and (f) landing gear 35.

As used herein, an unmanned aerial vehicle (UAV) 15 may comprise single ducted fan (Not Shown), double ducted fan (FIGS. 1-4), or multi-ducted fan assemblies, one or more helicopter assemblies, or any other vertical takeoff and landing vehicle known in the art. In a dual ducted fan embodiment, the fans counter rotate to compensate for the torque generated by each individual fan. Each embodiment may employ electric motors in place of a mechanical drive system. These various embodiments are detailed below. Preferably, the ducted fan assemblies 15 each include a duct 40, a spinner, a tail cone, a nose cone, a fan, a stator fan mount, and a drive gear 135. In a tri-ducted fan embodiment, the third ducted fan may have a right angle shaft from one of the duct drive gears 135 to transfer power to it. Alternatively, in a quad-ducted fan embodiment, the mechanical drive system could have two engines each of which drives two of the four ducts using drive gears 135. Preferably, the helicopter assemblies each include a housing, a rotor, rotor blades, and a drive gear.

As used herein, an unmanned ground vehicle (UGV) 20 may comprise any autonomous or remotely controlled vehicle with any ground ambulation mechanism 45 known in the art, for example, wheels or continuous tracks. More specific embodiments are detailed below.

As used herein, an engine shared by the UAV 15 and UGV 20 may be primarily located on either the UAV 15 or UGV 20. The power unit 25 may comprise a reciprocating engine or a turbine engine of a type known in the art. Preferably, a turbine engine 25 has a starter generator with a power density sufficient to drive up to four ducted fans or helicopter rotors. Energy transfer from the engine 25 to the one or more fans or helicopter rotors is through an energy transfer device 50 such as a differential spline system, a belt system, or a chain system. Alternatively, there may be no mechanical connections to the fans or rotors and instead the shared power unit 25 may comprise an electric generator that couples to electric motors under each of the UAV's ducted fans (or helicopter rotors) and to an electric motor on the UGV's ambulation mechanism 45.

As used herein, vehicle controls include vehicle control avionics and vehicle control system sensors of a type known in the art. More specifically, these controls include UAV and UGV surface and fan controls as well as drive systems for the ambulation mechanism 45 and manipulator arms 140. The control system is also responsible for navigating the UGV 20 into the proper engagement position and for activating the disengage and engage mechanisms.

Figure 6:
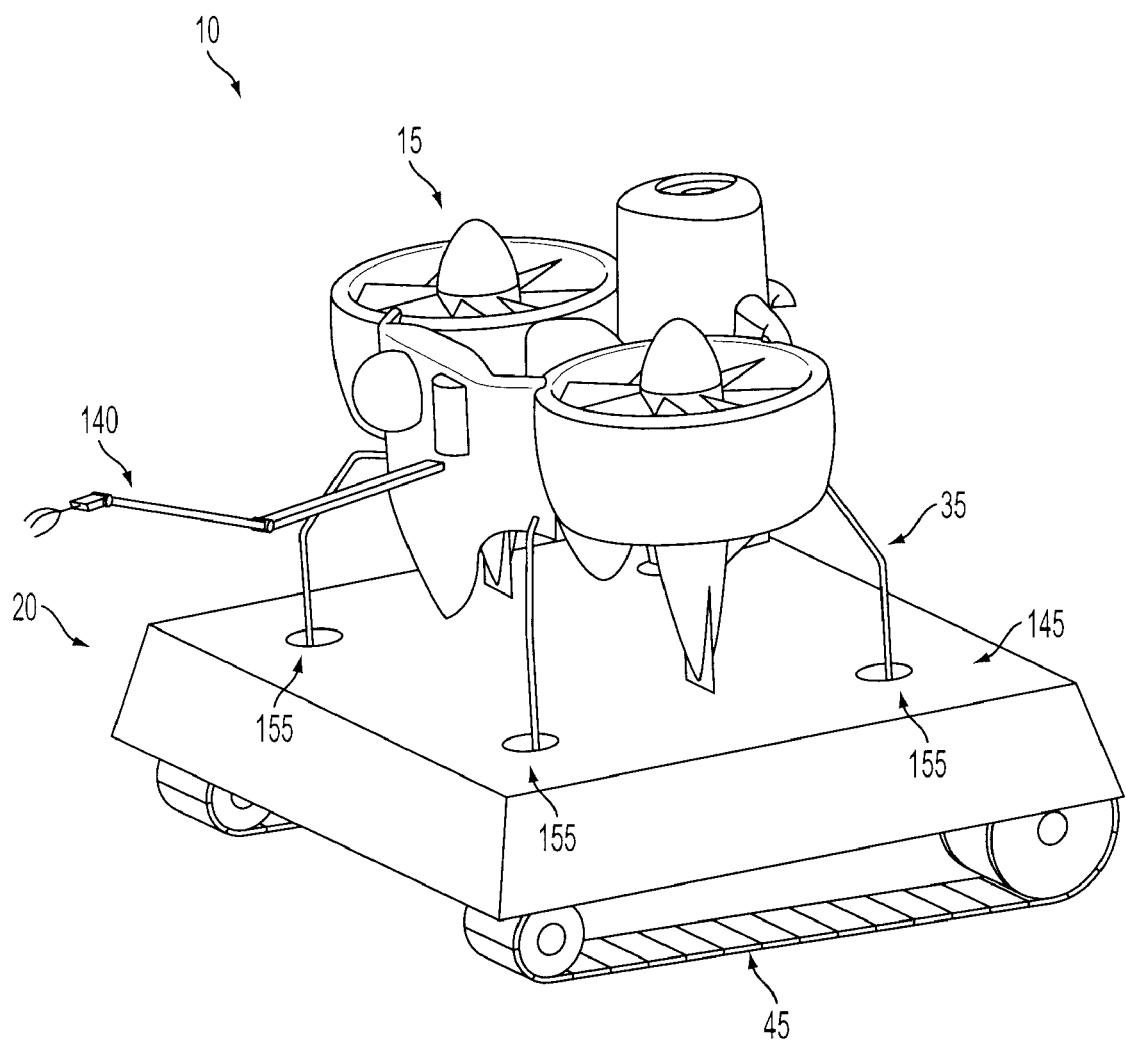
FIG. 6 is a perspective view of a transforming unmanned aerial-to-ground vehicle assembly in which the unmanned ground vehicle is integrated and engaged with the unmanned aerial vehicle.

As used herein, a disengagement mechanism 30 to separate the UGV 20 from the UAV 15 may include, for example, the UGV's ambulation mechanism 45, the UAV 15 itself, and one or more manipulator arms 140. Engagement and locking mechanisms may also include a solenoid driven clamping system, engagement rods, locking dovetails, screw jacks, or other known clamping and locking mechanisms. For example, the UGV's ambulation mechanism 45 may be capable of raising and lowering the UGV 20 or moving the UGV 20 forward and rearward such that the UGV 20 enters into and out of engagement with a latching mechanism 55 on the UAV 15. In another embodiment, the UAV 15 may simply lift off in flight, removing landing gear 35 from latches 55 on the UGV 20. In a further embodiment, the one or more manipulator arms 140 may be capable of raising and lowering the UGV 20 or moving the UGV 20 forward and rearward such that the UGV 20 enters into and out of engagement with a latching mechanism 55 on the UAV 15. In addition, the engagement mechanism may include a guidance control system, such as a cone to receive connectors or landing legs as illustrated in FIG. 6, a basic wedge connection, electromagnetics, or an optical system employing surveillance cameras and optical processing.

As used herein, one or more manipulator arms 140 contained on either the UAV 15 or the UGV 20 comprise a robotic arm with an end effector, such as a sensor, clamp, grapple, or claw, for gathering data or maneuvering past obstacles. Preferably, the one or more manipulator arms 140 have multiple degrees of freedom. The one or more manipulator arms 140 are preferably stowed during flight.

As used herein, the landing gear 35 may be retractable or fixed and may be attached to either the UGV 20 or the UAV 15. Preferably, the landing gear 35 comprises a plurality of shaped rods that are attached in a manner that prevents them from rotating during landing for example via a solenoid driven positioning system. The shape of the landing gear rods 35 may vary, but where the landing gear 35 is retractable, the rods 35 preferably conform to the shape of the exterior of the duct 40 so that upon rotating ninety degrees, the landing gear 35 rests substantially flush against the duct 40. Alternatively, the landing gear 35 may comprise jointed rods.

In one embodiment, shown in FIGS. 1-4, the UAV 15 comprises a first ducted fan assembly 60, a second ducted fan assembly 65, and a forward payload pod 70 affixed on a first end 75 to the first ducted fan assembly 60 and affixed on a second end 80 to the second ducted fan assembly 65, wherein the UGV 20 comprises a power unit 25 contained in a power unit housing 85, a first rearward payload pod 90 connected to the power unit housing 85, a second rearward payload pod 95 connected to the power unit housing 85, a base 100 moveably connected to the power unit housing 85, and an ambulation mechanism 45 moveably connected to the base 100, and wherein a free end 105 of the first rearward payload pod 90 is capable of being connected to the first ducted fan assembly 60 and a free end 110 of the second rearward payload pod 95 is capable of being connected to the second ducted fan assembly 65. As used herein, the UAV 15 is used to quickly deploy the UGV 20 to a mission site.

As used herein, the first ducted fan assembly 60 and second ducted fan assembly 65 are substantially identical in dimension. As such, the system is balanced from side-to-side and adjustments are made in the design and placement of the forward payload pod 70, the rearward payload pods, 90, 95 and the UGV 20 to maintain a functional center of gravity. In embodiments that employ more than two ducted fan assemblies 15, the additional ducts 15 are joined together by additional fixed or removable payload pods.

As used herein, the forward payload pod 70 may contain sensors and/or various payloads, including a fuel tank or bladder. These sensors are of a type known in the art and may include visual imaging 72 or other surveillance payloads common to both the UGV 20 and the UAV 15. These surveillance payloads are preferably primarily located on the UGV 20, but when the UAV 15 and UGV 20 are engaged the surveillance payloads operate to provide visibility to the desired sensing field of view. Preferably, the forward payload pod 70 may have sensor visibility that is one hundred eighty degrees or greater in forward flight. The forward payload pod 70 may be permanently affixed between the first and second ducted fan assemblies 60, 65 or may be alternatively affixed via latching mechanisms 55 to allow a change in payload or sensors or a quick refuel. The forward payload pod 70 preferably has an aerodynamic cross-section and, in a front view, is substantially "V" shaped with the longest chord essentially midway between the two ducted fan assemblies 60, 65 to generate more lift. The center of gravity relative to the leading edge lip of each duct 40 is maintained by the location of the attachment points 75, 80 between the forward payload pod 70 and the ducted fan assemblies 60, 65 and also by the weight capacity of the forward payload pod 70. The center of gravity and the locations of the forward payload pod's attachment points 75, 80 are also contingent on the location of the attachment point between the UGV's rearward payload pods 90, 95 and the ducted fan assemblies 60, 65, as discussed in more detail below.

Figure 5:
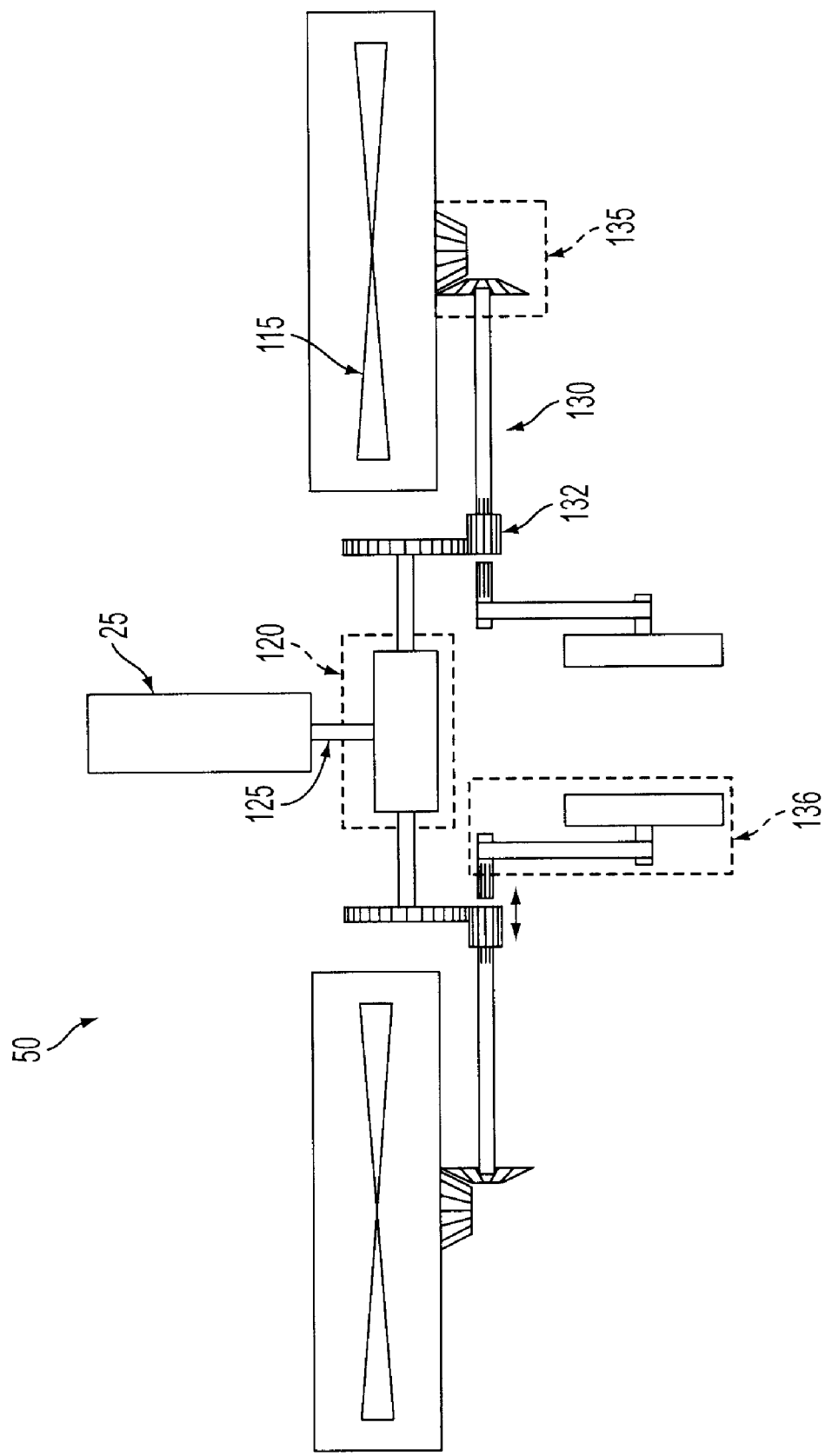
FIG. 5 is a side view of a power transmission system between an unmanned ground vehicle and an unmanned aerial vehicle.

As used herein, the power unit 25 may be a turbine or reciprocating engine, an electric generator, or any other power source known in the art. Where the power unit 25 is a turbine engine or a reciprocating engine, for example, the drive gear is counter-rotating such that the fans 115 are counter-rotating. As shown in detail in FIG. 5, power is provided into a differential 120, for example, from the engine 25 through a retractable splined coupling 132 extending from the power unit housing 85. The differential 120 transfers this power to the ducted fan assemblies 60, 65 through two splined shafts 130 that are each connected to a right angle gear 135 under each prop. The relative speeds of the output shafts 130 are controlled through individually applying braking forces to the splined shafts 130 by speed brakes or via a shaft loading system. Speed brakes can be either frictional or electric generators with variable load controls. The splined coupling 125 can be retracted into the power unit housing 85 for disengagement from the UAV 15 and extended for re-engagement with the UAV 15 and is preferably tapered to easily mate with the differential 120. FIG. 5 shows the splined shafts 130 engaged with the ducted fan assemblies 60, 65 to drive the fans. The UGV 20 disengages from the UAV fans and engages the UGV drive mechanism 136 by sliding the splined coupling 132 inward toward the center of the UGV 20. For embodiments with more than two ducted fan assemblies 60, 65, the differential is configured to drive an equivalent number of splined shafts. Where the power unit 25 is an electric generator, power is supplied through electrical couplings between the UGV's rearward payload pods 90, 95 and the UAV's ducts 40 and the electric motors drive the fans with an electronic speed control.

As used herein, the power unit housing 85 preferably has a smooth aerodynamic shape and surface, as well as other aerodynamic properties. For example, the power unit housing 85 may have a tail cone for engine exhaust exit 180. Further, the power unit housing 85 may house engine controls.

As used herein, the rearward payload pods 90, 95 preferably have an aerodynamic cross-section. The first and second rearward payload pods 90, 95 may be permanently affixed to the UGV's power unit housing 85 or alternatively affixed via latching mechanisms 55 to allow a change in payload or sensors. The rearward payload pods 90, 95 are preferably attached closer to the rearward side of the UGV's power unit housing 85 than to the forward side in order to concentrate the UGV's weight closer to the center of the transforming unmanned aerial-to-ground vehicle assembly 10 to maintain a functional center of gravity. The free ends of the first and second rearward payload pods 105, 110 are affixed via latching mechanisms 55 to the first and second ducted fan assemblies 60, 65, respectively, to allow the UGV 20 to disengage and re-engage with the UAV 15. To maintain the center of gravity, the location of the attachment points of the rearward payload pods 90, 95 to the ducted fan assemblies 60, 65 are conditioned upon the weight capacities of the rearward payload pods 90, 95, the weight of the UGV 20, and the location and weight of the forward payload pod 70. Further, first and second rearward payload pods 105, 110 may house one or more manipulator arms 140.

In addition, the rearward payload pods 90, 95 may contain the shared vehicle controls. If the rearward payload pods 90, 95 contain the vehicle controls instead of the power unit housing 85, the rearward payload pods 90, 95 must remain attached to the UGV 20 upon disengagement from the UAV 15, otherwise the UGV 20 would be rendered inoperable. If the power unit housing 85 contains the vehicle controls, then the rearward payload pods 90, 95 may remain attached to the UAV 15 when the UGV 20 disengages from the UAV 15. Alternatively, in an embodiment employing wireless communication, portions of the vehicle controls may be contained on either the UGV 20 or the UAV 15 and the vehicle controls may include re-engagement command signals to rejoin the UGV 20 to the UAV 15.

As used herein, the base is moveably connected to the power unit housing 85 via at least one rigid member that may travel in a slot beginning at a point on the forward side of the power unit housing 85 that runs substantially vertically downward to the bottom side of the power unit housing 85. This slot allows the base 100 to travel from an essentially horizontal position parallel to the ground to an essentially vertical position. An electric motor coupled to the vehicle controls operates in forward and reverse modes to drive the rigid member and base 100 in the appropriate direction along the slot. In order to prevent contaminants, such as dirt and water, from entering the power unit housing 85, the slot may be lined with, for example, rubber flaps, stiff groups of bristles, or a continuous movable track attached at both ends to the rigid member.

As used herein, the ambulation mechanism 45 may comprise wheels, continuous tracks, or any other type of ambulation mechanism 45 known in the art, that are moveably connected to the base 100 by a suspension system of a type known in the art. Terrain capabilities are determined by the UGV's center of gravity and tipping angles. By spreading the distance between the continuous tracks or wheels, for example, a larger base is created that can accommodate larger tipping angles. The ambulation mechanism 45 is powered by the power unit 25 in a manner described above. For instance, where the power unit 25 is an electric generator, the electric generator 25 transfers power to an electric motor that in turn drives the ambulation mechanism 45 using systems known in the art. Similarly, where the power unit 25 is an engine, the engine 25 transfers power to a differential which in turn transfers power to splined shafts connected to the ambulation mechanism 45.

The ambulation mechanism 45 is also moveably connected to the base 100 in another respect. The ambulation mechanism 45 moves relative to the base 100 by transitioning into or underneath the base when the UGV 20 is engaged or integrated with the UAV 15, as detailed below.

Figure 3:
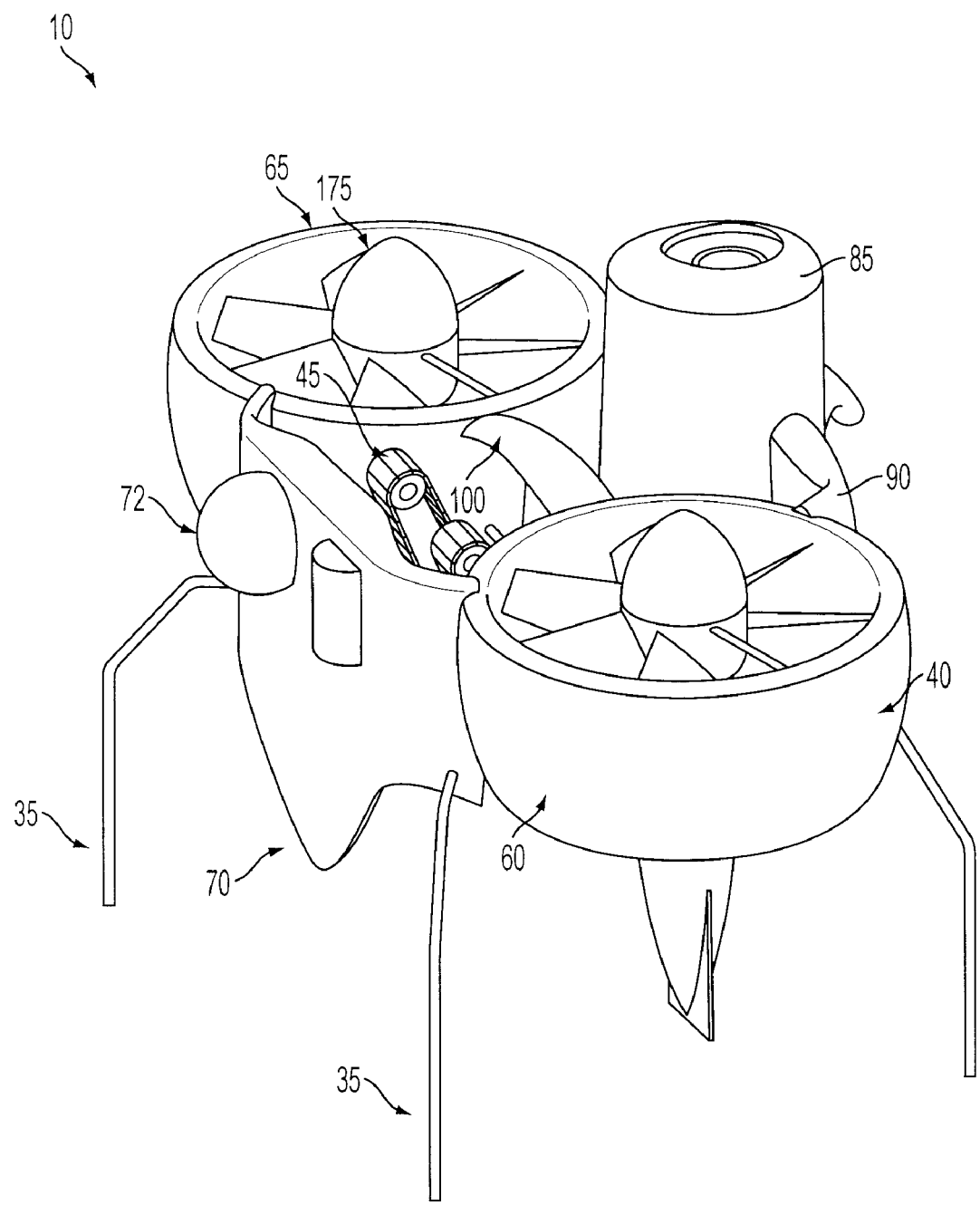
FIG. 3 is a perspective view of a transforming unmanned aerial-to-ground vehicle assembly in which the unmanned ground vehicle is integrated and engaged with the unmanned aerial vehicle and in which the ambulation mechanism is folding into the base.
Figure 4:
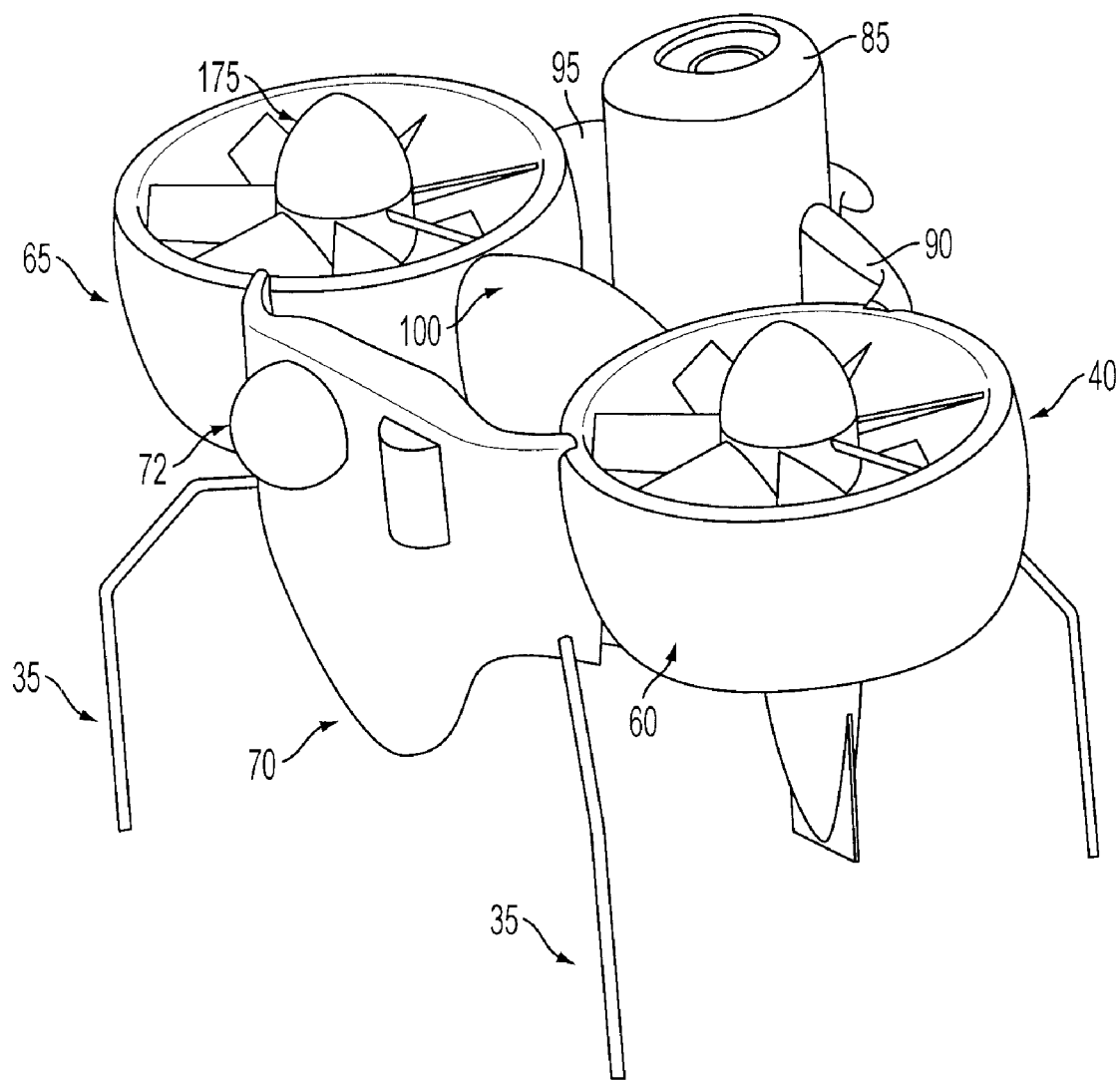
FIG. 4 is a perspective view of a transforming unmanned aerial-to-ground vehicle assembly in which the unmanned ground vehicle is integrated and engaged with the unmanned aerial vehicle and in which the unmanned ground vehicle is in the stowed position.

In one embodiment, the UGV 20 is capable of transitioning between a stowed position for flight and an active position for ground ambulation. As used herein, a stowed position means that the UGV 20 and UAV 15 are integrated or engaged and the ambulation mechanism 45 is moved out of contact with the ground and stowed in an aerodynamic fashion. This can be accomplished by simply lifting the ambulation mechanism 45 off the ground such that the base 100 is sheltered beneath the power unit housing 85. Alternatively, as shown in FIGS. 3-4, the UGV 20 is affixed to the UAV 15 via the first and second rearward payload pods 90, 95, and the base 100 is rotated to a substantially vertical position such that the bottom of the base 100 faces the forward payload pod 70, the top of the base 100 faces the power unit housing 85, and each side of the base 100 faces one of the ducted fan assemblies 60, 65. In the stowed position, the base 100 is preferably locked to the first and second ducted fan assemblies 60, 65 via solenoid driven release latches 55, for example, coupled to the vehicle controls.

As used herein, the active position means that the base 100 is rotated to a substantially horizontal position and the UGV 20 and UAV 15 are disengaged or prepared to disengage and the ambulation mechanism 45 is capable of contacting the ground. When the UGV 20 transitions into an active position prior to separating from the UAV 15, the ambulation mechanism 45 is fully extended or unfolded from the base 100 and operable. When the UGV 20 and UAV 15 are coupled at the latching mechanism 55 the splined coupling 132 slides to engage the UAV drive shaft 130 and disengage from the ambulation drive 136. The ambulation tracks 30, 45 are then rotated up into a stowed position within the base 100. The base 100 provides an aerodynamic enclosure for the ambulation tracks 30, 45 while in flight. The ambulation mechanism 45 is folded into the base 100 via a mechanical system that first lifts the ambulation tracks off the ground, slides them into the base 100, and then the base 100 containing the ambulation tracks 30, 45 is rotated and lifted in between the two UAV duct fan assemblies 60, 65.

Figure 2:
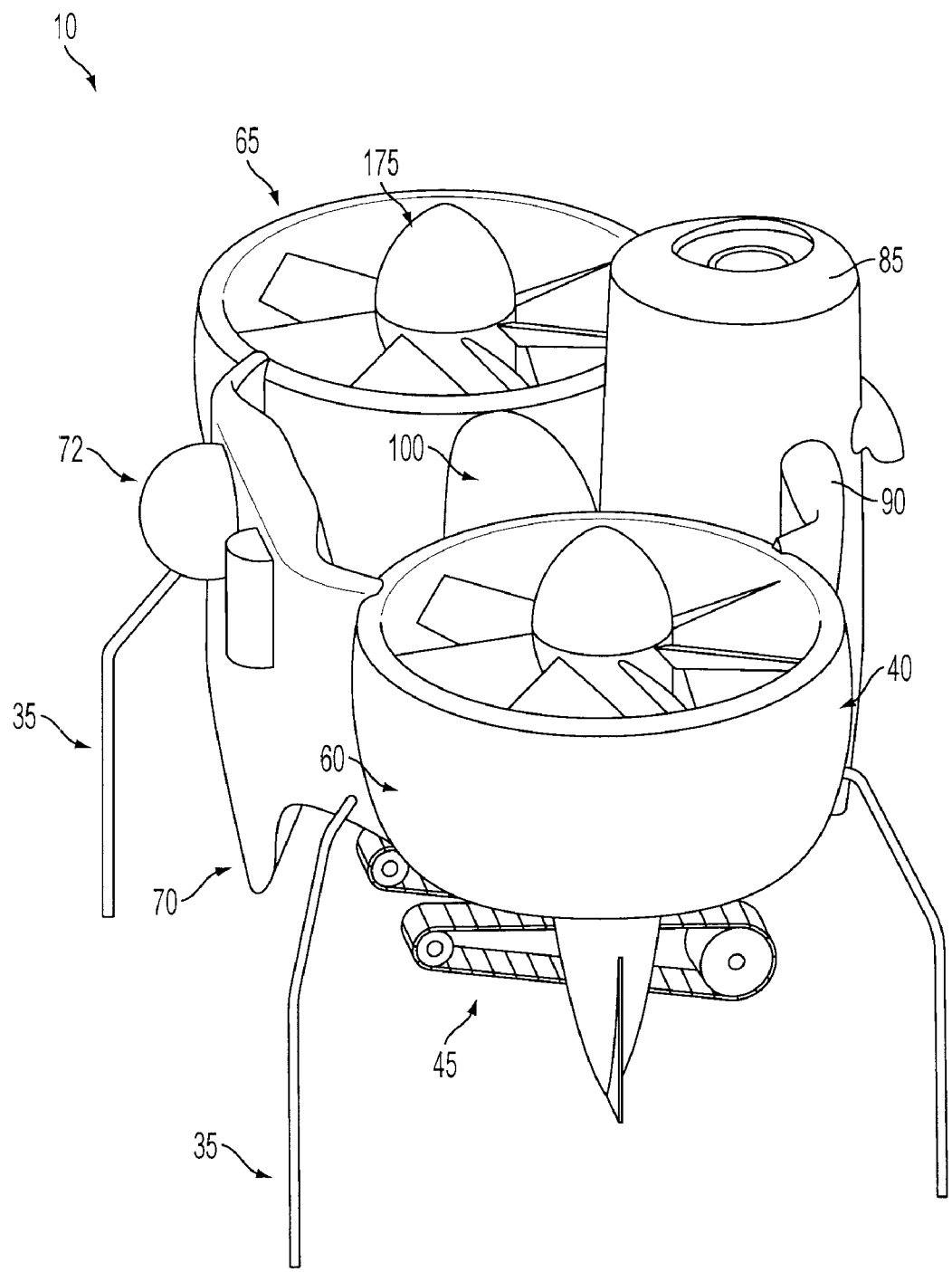
FIG. 2 is a perspective view of a transforming unmanned aerial-to-ground vehicle assembly in which the unmanned ground vehicle is integrated and engaged with the unmanned aerial vehicle and in which the base and ambulation mechanism are transitioning from an active position to a stowed position.

In one embodiment, the base is aerodynamically shaped. As used herein, when the base 100 is in the stowed position and is substantially vertical, as shown in FIG. 2, the aerodynamic cross-section is facing in the appropriate direction for flight. Similarly, when the base 100 is in the active position and is substantially horizontal, as shown in FIG. 1, the aerodynamic cross-section is facing the appropriate direction for forward motion along the ground.

In one embodiment, the UGV 20 is integrated with the UAV 15 via a latching mechanism 55, and the latching mechanism 55 ensures proper alignment of electrical connector pins contained on both the UGV 20 and the UAV 15. As used herein, the latching mechanism 55 may comprise solenoid driven latches or dovetail latches coupled to the vehicle controls. Although solenoid driven latches and dovetail latches are described, this disclosure is not meant to limit the attachment method. Any other well known method of attachment can be used. The free ends of the first and second rearward payload pods 105, 110 are each attached to a latching mechanism 55 and the ducted fan assemblies 60, 65 each are attached to a corresponding latching mechanism 55. In addition, in an embodiment where the rearward payload pods 90, 95 are detachable from the UGV 20, the rearward payload pods 90, 95 each are attached to an additional latching mechanism 55 and the UGV 20 is attached to corresponding latching mechanisms 55. The female latching mechanisms 55, which receive the male latching mechanisms 55, preferably have wider openings that taper to help guide the rearward payload pods' latching mechanisms 55 into the corresponding latching mechanisms 55 on the ducted fan assemblies 15 and the UGV 20.

In addition, the latching mechanisms 55 may be oriented substantially vertically or horizontally. The latching mechanisms 55 may also be angled. Where the latching mechanisms 55 are arranged vertically, the rearward payload pods' latching mechanisms 55 can engage and disengage from the UAV's latching mechanisms 55 by being raised or lowered into engagement by the ambulation mechanism 45. In another embodiment, the UGV's latching mechanisms 55 can engage and disengage from the rearward payload pods' latching mechanisms 55 by being raised or lowered into engagement. Where the latching mechanisms 55 are arranged horizontally, the rearward payload pods' latching mechanisms 55 can engage and disengage from the UAV's latching mechanisms 55 by the UGV's ambulation mechanism 45 moving in forward or reverse. In another embodiment, the UGV's latching mechanisms 55 can engage and disengage from the rearward payload pods' latching mechanisms 55 by the UGV's ambulation mechanism 45 moving in forward or reverse.

Further, each latching mechanism 55 has a servo driven vertical adjustment to assist in alignment during re-engagement of the UGV 20 with the UAV 15. Although, the primary adjustment may be in the horizontal direction with a major correction that may be accomplished by the ambulation mechanism's approach to the UAV 15. Additional fine location adjustments may be accomplished by mechanical guides or via short range vertical and horizontal servo latches. An alternative approach is to employ a rotating spiral latch that draws the UGV 20 into a firm locked position.

In one embodiment, the ambulation mechanism 45 is a dual set of continuous tracks. The continuous tracks 45 may comprise a flexible, treaded belt with the forward and rearward ends suspended around rollers. Alternatively, the continuous tracks 45 may comprise a number of rigid units that are joined to each other and suspended about rollers at the forward and rearward ends.

In one embodiment, the disengagement mechanism 30 comprises the dual set of continuous tracks, and disengages the UGV 20 from the UAV 15 by rotating the front ends of the tracks toward the ground until contact and continuing to push the front ends against the ground causing the UGV 20 to lift up and out of the latching mechanism 55, and re-engages the UGV 20 with the UAV 15 by rotating the back ends of the tracks upward causing the UGV 20 to lift up and over the latching mechanism 55 and lowering the UGV 20 into the latching mechanism 55.

In one embodiment, one of the one or more manipulator arms 140 is contained in the top of the power unit housing 85. The manipulator arm 140 has at least three degrees of freedom that is extensible to a degree sufficient to reach the ground. The manipulator arm 140 may comprise servo driven azimuth controls, two servo driven elbows, a screw driven longitudinally driven extensible member, and a tool control at the end of the arm.

In one embodiment, the UAV 15 comprises a ducted fan assembly, which houses the shared power unit 25 and vehicle controls, and has permanently extended landing gear 35, and wherein the UGV 20 comprises an all terrain vehicle that has a landing platform 145 formed on the top surface of the all terrain vehicle and one or more payload pods (not shown) integrated into a housing of the all terrain vehicle, and wherein the landing gear 35 of the UAV 15 is received by a plurality of landing gear receptacles 155 contained in the landing platform 145 of the UGV 20. As used herein, the UGV 20 is used to deliver the UAV 15 to a location for the UAV 15 to carry out a mission. In addition, the UAV 15 is capable of lifting the UGV 20 to avoid obstacles on the ground, such as ravines or rivers.

As used herein, the UGV 20 preferably comprises a commercial-off-the-shelf, all terrain vehicle capable of extreme mobility and obstacle negotiation. Alternatively, the UGV 20 may comprise a tracked vehicle or a vehicle that is both tracked and wheeled. The payload pods integrated into the housing of the unmanned aerial vehicle may contain sensors, additional fuel, or any other mission appropriate cargo.

When the UGV 20 and UAV 15 are integrated and prepared for ground mobility, the UAV's landing gear 35 is locked into position via solenoid latches 55 in the landing gear receptacles on the UGV's landing platform 145. These solenoid latches 55 are activated by the vehicle controls. In an embodiment with multiple single duct UAVs 15, the landing platform 145 is configured to contain landing gear receptacles 155 for each UAV 15. Each UAV 15 in turn contains vehicle controls for both the UAV 15 and UGV 20 this ensures that if one or more UAVs 15 are lost during a mission the remaining UAV 15 can still re-engage with the UGV 20 and control its operation.

As used herein, the power unit 25 may be a turbine or reciprocating engine, an electric generator, or any other power source known in the art. Where the power unit 25 is a turbine engine or a reciprocating engine, for example, the engine transfers power to a differential 120 contained in the UGV 20, for example, via a retractable splined coupling 125 extending from the power unit housing 85 through an opening (not shown) in the landing platform 145. The splined coupling 125 can be refracted into the power unit housing 85 for disengagement from the UAV 15 and extended for re-engagement with the UAV 15 and is preferably tapered for easy engagement with the differential 120. The opening in the landing platform 145 may have a spring loaded covering that slides aside upon the application of pressure from the extending splined coupling 125 and returns into place upon removal of the splined coupling 125. The differential 120 transfers power from the splined coupling 125 to splined shafts 130 integrated in the UGV's transmission system. For embodiments with more than two ducted fan assemblies, there is a corresponding differential configured to drive a segment of the transmission system. Where the power unit 25 is an electric generator, power is supplied through electrical couplings contained in the UGV's landing gear receptacles 155 and the UAV's landing gear 35 and an electric motors drive the UGV 20 and the UAV's fans with an electronic speed control.

In one embodiment, the landing gear 35 comprises a plurality of substantially rigid legs, wherein the plurality of landing gear receptacles 155 are conically shaped to guide the landing gear 35 into proper alignment with a latching mechanism (not shown in FIG. 6). The landing platform 145 is substantially planar and preferably contains a guidance marker on its surface, such as an "X", that corresponds with the location of the landing gear receptacles 145. The UAV's sensor payload can send real-time images of the guidance marker to a remote operator who can control the UAV's position and align the landing gear 35 with the landing gear receptacles 145 during re-engagement with the UGV 20. The conical shape of the landing gear receptacles 145 increases the allowable margin of error when landing the UAV 15 by increasing the surface area landing zone for each rigid leg 35. Once the rigid legs 35 contact the interior of the cones 145, the legs 35 slide down into the landing platform 145 where they are locked in place preferably by a solenoid operated latching mechanism.

The latching mechanism can be operated in many ways. In one embodiment, the latching mechanism comprises a plurality of solenoid latches corresponding with each of the plurality of landing gear receptacles. For example, the rigid legs 35 may contain through-holes near their base into which solenoid operated bolts are inserted by the latching mechanism. Alternatively, the rigid legs 35 may contain a tapered lip near their base that allows each leg 35 to easily slide into proper alignment while providing a surface that can be clamped down by solenoid operated latches that slide into place.

The latching mechanism must be strong enough to remain in a locked position when the integrated UGV 20 and UAV 15 are in flight. The rigid legs 35 and the connections to the UAV 15 must be strong enough to bear the weight of the UGV 20 for short flights to avoid obstacles. The rigid legs 35 are preferably made from lightweight high strength composite structures. The rigid legs 35 are connected to the UAV duct's internal structure, leaving the aerodynamic surface separate from structural forces. They may be permanently bonded or welded to the underlying skeletal structure or they may be bolted in place.

In one embodiment, the landing gear 35 provides an interface of electrical connector pins to transmit electrical power and control signals between the UAV 15 and the UGV 20. The landing gear receptacles 155 ensure proper alignment of the landing gear's electrical connector pins with complementary electrical connector pins in the landing platform 145. These connector pins interface with the vehicle controls via electrical wire and/or fiber optics on board the UAV 15 and UGV 20.

In one embodiment, the landing gear 35 is protected on the end of each substantially rigid leg 35 by a spring loaded cap (not shown). As the landing gear 35 contacts the landing gear receptacles 155, the pressure exerted on the spring loaded caps causes the caps to slide to the side and the base of the landing gear receptacles 155 are configured to accommodate the volume of the cap. Alternatively, the caps operate in response to signals from the avionics controls or via a mechanical key in the landing gear receptacles 155.

In one embodiment, the disengagement mechanism 30 comprises the UAV 15 itself, which disengages from the UGV 20 by taking off and re-engages by landing on the landing platform 145.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

The invention claimed is:

1. A transforming unmanned aerial-to-ground vehicle assembly comprising:
    an unmanned aerial vehicle integrated with an unmanned ground vehicle, the integration between the unmanned aerial vehicle and the unmanned ground vehicle being strong enough to bear the weight of the unmanned ground vehicle during flight of the unmanned aerial vehicle;
    a power unit shared by the unmanned aerial vehicle and the unmanned ground vehicle;
    vehicle controls shared by the unmanned aerial vehicle and the unmanned ground vehicle;
    a disengagement mechanism to separate the unmanned ground vehicle from the unmanned aerial vehicle;
    one or more manipulator arms located on either the unmanned aerial vehicle or the unmanned ground vehicle; and
    landing gear.

2. The transforming unmanned aerial-to-ground vehicle assembly of claim 1, wherein the unmanned aerial vehicle comprises a first ducted fan assembly, a second ducted fan assembly, and a forward payload pod affixed on a first end to the first ducted fan assembly and affixed on a second end to the second ducted fan assembly, wherein the unmanned ground vehicle comprises a power unit contained in a power unit housing, a first rearward payload pod connected to the power unit housing, a second rearward payload pod connected to the power unit housing, a base moveably connected to the power unit housing, and an ambulation mechanism moveably connected to the base, and wherein a free end of the first rearward payload pod is capable of being connected to the first ducted fan assembly and a free end of the second rearward payload pod is capable of being connected to the second ducted fan assembly.

3. The transforming unmanned aerial-to-ground vehicle assembly of claim 1, wherein the unmanned ground vehicle is capable of transitioning between a stowed position for flight and an active position for ground ambulation.

4. The transforming unmanned aerial-to-ground vehicle assembly of claim 2, wherein the unmanned ground vehicle is capable of transitioning between a stowed position for flight and an active position for ground ambulation, and wherein the base houses the ambulation mechanism when in the stowed position, and wherein the ambulation mechanism is fully extended from the base when the unmanned ground vehicle transitions into an the active position prior to separating from the unmanned aerial vehicle.

5. The transforming unmanned aerial-to-ground vehicle assembly of claim 2, wherein the unmanned ground vehicle is capable of transitioning between a stowed position for flight and an active position for ground ambulation, and wherein, in the stowed position, the unmanned ground vehicle is affixed to the unmanned aerial vehicle via the first and second rearward payload pods, and the base is rotated to a substantially vertical position such that a bottom of the base faces the forward payload pod, a top of the base faces the power unit housing, and each side of the base faces one of the ducted fan assemblies.

6. The transforming unmanned aerial-to-ground vehicle assembly of claim 2, wherein the unmanned ground vehicle is capable of transitioning between a stowed position for flight and an active position for ground ambulation, and wherein, in the active position, the base is rotated to a substantially horizontal position and the ambulation mechanism is capable of making contact with ground.

7. The transforming unmanned aerial-to-ground vehicle assembly of claim 2, wherein the base is aerodynamically shaped.

8. The transforming unmanned aerial-to-ground vehicle assembly of claim 1, wherein the unmanned ground vehicle is integrated with the unmanned aerial vehicle via a latching mechanism, and wherein the latching mechanism ensures proper alignment of electrical connector pins contained on both the unmanned ground vehicle and the unmanned aerial vehicle.

9. The transforming unmanned aerial-to-ground vehicle assembly of claim 2, wherein the ambulation mechanism is a dual set of continuous tracks.

10. The transforming unmanned aerial-to-ground vehicle assembly of claim 1, wherein the disengagement mechanism comprises a dual set of continuous tracks and the unmanned ground vehicle is integrated with the unmanned aerial vehicle via a latching mechanism, wherein the disengagement mechanism disengages the unmanned ground vehicle from the unmanned aerial vehicle by rotating front ends of the tracks toward the ground until contact and continuing to push the front ends against the ground to cause the unmanned ground vehicle to lift up and out of the latching mechanism, and wherein the disengagement mechanism re-engages the unmanned ground vehicle with the unmanned aerial vehicle by rotating back ends of the tracks upward to cause the unmanned ground vehicle to lift up and over the latching mechanism and lowering the unmanned ground vehicle into the latching mechanism.

11. The transforming unmanned aerial-to-ground vehicle assembly of claim 10, wherein the latching mechanism comprises a dovetail joint.

12. The transforming unmanned aerial-to-ground vehicle assembly of claim 1, wherein one of the one or more manipulator arms is located at the a top of the power unit housing.

13. The transforming unmanned aerial-to-ground vehicle assembly of claim 1, wherein the unmanned aerial vehicle comprises a ducted fan assembly, which houses the shared power unit and vehicle controls and has permanently extended comprises the landing gear, and wherein the unmanned ground vehicle comprises an all terrain vehicle that comprises a landing platform formed on the a top surface of the all terrain vehicle and one or more payload pods integrated into a housing of the all terrain vehicle, and wherein the landing gear of the unmanned aerial vehicle is received by a plurality of landing gear receptacles contained in the landing platform of the unmanned ground vehicle.

14. The transforming unmanned aerial-to-ground vehicle assembly of claim 13, wherein the landing gear comprises a plurality of substantially rigid legs, and wherein the plurality of landing gear receptacles are conically shaped to guide the landing gear into proper alignment with a latching mechanism that integrates the unmanned ground vehicle with the unmanned aerial vehicle.

15. The transforming unmanned aerial-to-ground vehicle assembly of claim 14, wherein the latching mechanism comprises a plurality of solenoids corresponding with each of the plurality of landing gear receptacles.

16. The transforming unmanned aerial-to-ground vehicle assembly of claim 1, wherein the landing gear provides an interface of electrical connector pins to transmit electrical power and control signals between the unmanned aerial vehicle and the unmanned ground vehicle.

17. The transforming unmanned aerial-to-ground vehicle assembly of claim 1, wherein the landing gear is protected on the end of each substantially rigid leg by a spring loaded cap.

18. The transforming unmanned aerial-to-ground vehicle assembly of claim 13, wherein the disengagement mechanism comprises the unmanned aerial vehicle itself, which disengages from the unmanned ground vehicle by taking off and re-engages by landing on the landing platform.

19. The transforming unmanned aerial-to-ground vehicle assembly of claim 1, wherein the disengagement mechanism comprises the one or more manipulator arms, the one or more manipulator arms being configured to move the unmanned ground vehicle relative to the unmanned aerial vehicle.

20. A method comprising:
with an unmanned aerial vehicle of an assembly, lifting an unmanned ground vehicle of the assembly off a ground, wherein the unmanned aerial vehicle is integrated with the unmanned ground vehicle, the assembly further comprising:
a power unit shared by the unmanned aerial vehicle and the unmanned ground vehicle;
vehicle controls shared by the unmanned aerial vehicle and the unmanned ground vehicle;
a disengagement mechanism to separate the unmanned ground vehicle from the unmanned aerial vehicle; and
one or more manipulator arms located on either the unmanned aerial vehicle or the unmanned ground vehicle; and
with the disengagement mechanism of the system, disengaging the unmanned ground vehicle from the unmanned aerial vehicle.

* * * * *

UNITED STATES PATENT AND TRADEMARK OFFICE
CERTIFICATE OF CORRECTION

PATENT NO. : 8,205,820 B2  
APPLICATION NO. : 12/364762  
DATED : June 26, 2012  
INVENTOR(S) : Emray R. Goossen et al.

Page 1 of 1

It is certified that error appears in the above-identified patent and that said Letters Patent is hereby corrected as shown below:

Col. 12, Lines 2-3 (Claim 13), "and has permanently extended comprises" should be
-- and comprises --

Signed and Sealed this
Twenty-sixth Day of February, 2013

Teresa Stanek Rea
*Acting Director of the United States Patent and Trademark Office*